(12) United States Patent
Göktepe et al.

(10) Patent No.: US 11,683,128 B2
(45) Date of Patent: Jun. 20, 2023

(54) RECEIVER, TRANSMITTER, COMMUNICATION NETWORK, DATA SIGNAL AND METHOD IMPROVING A RETRANSMISSION PROCESS IN A COMMUNICATION NETWORK

(71) Applicant: KONINKLIJKE PHILIPS N.V., Eindhoven (NL)

(72) Inventors: Baris Göktepe, Berlin (DE); Thomas Fehrenbach, Berlin (DE); Cornelius Hellge, Berlin (DE); Thomas Schierl, Berlin (DE); Thomas Wirth, Kleinmachnow (DE); Marco Breiling, Erlangen (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 17/526,404

(22) Filed: Nov. 15, 2021

(65) Prior Publication Data
US 2022/0077966 A1    Mar. 10, 2022

Related U.S. Application Data

(63) Continuation of application No. 16/680,050, filed on Nov. 11, 2019, now Pat. No. 11,277,230, which is a
(Continued)

(30) Foreign Application Priority Data

May 12, 2017  (EP) ..................... 17170871

(51) Int. Cl.
*H04L 1/18* (2023.01)
*H04L 1/1812* (2023.01)
(Continued)

(52) U.S. Cl.
CPC .......... *H04L 1/1816* (2013.01); *H04L 1/1858* (2013.01); *H04L 1/1864* (2013.01); *H04W 72/044* (2013.01)

(58) Field of Classification Search
CPC ....... H04Q 11/0067; H04Q 2011/0084; H04Q 2011/0086; H04Q 2213/056; G06N 20/00;
(Continued)

(56) References Cited

U.S. PATENT DOCUMENTS 9,647,865 B1    5/2017  Limberg
2011/0264976 A1  10/2011  Yang et al.
(Continued)

FOREIGN PATENT DOCUMENTS

EP    3327837 A1    5/2018

OTHER PUBLICATIONS

Nokia, Alcatel-Lucent Shanghai Bell, "Early Hybrid ARQ Feedback for the 5G New Radio", 3GPP TSG-RAN WG1 #86bis, Lisbon, Portugal, Oct. 10-14, 2016, R1-1609745.
(Continued)

*Primary Examiner* — Mewale A Ambaye

(57) ABSTRACT

A receiver is described which receives data from a transmitter. The data is included in a data block which includes at least one code block, and the code block has a plurality of parts. A first part of the code block is used for estimating a decodability of the code block at the receiver. The first part of the code block is arranged in the data block ahead of the remaining one or more parts of the code block. The receiver estimates, prior to receiving the entire data block, the decodability of the code block using the first part of the code block.

20 Claims, 5 Drawing Sheets

Related U.S. Application Data continuation of application No. PCT/EP2018/061372, filed on May 3, 2018.

(51) Int. Cl.
*H04L 1/1829* (2023.01)
*H04W 72/044* (2023.01)

(58) Field of Classification Search
CPC ...... G06N 5/04; H04B 10/27; H04B 10/0795; H04L 41/5022; H04L 47/6275; H04L 47/808
See application file for complete search history.

(56) References Cited

U.S. PATENT DOCUMENTS

| | | |
|---|---|---|
| 2011/0276851 A1 | 11/2011 | Nagaraja |
| 2013/0223364 A1 | 8/2013 | Akkarakaran et al. |
| 2014/0201586 A1 | 7/2014 | Pajukoski et al. |
| 2015/0049690 A1 | 2/2015 | Sambhwani et al. |
| 2016/0261383 A1 | 9/2016 | Bergström et al. |
| 2017/0135084 A1 | 5/2017 | Kuchibhotla et al. |
| 2018/0034587 A1 | 2/2018 | Kim et al. |
| 2018/0132304 A1* | 5/2018 | Lee .................. H04W 76/38 |
| 2019/0037461 A1* | 1/2019 | Li .................... H04W 80/02 |
| 2019/0075590 A1 | 3/2019 | Andersson et al. |
| 2019/0215685 A1* | 7/2019 | Wang ............... H04W 80/08 |
| 2020/0119851 A1 | 4/2020 | Ma et al. |

OTHER PUBLICATIONS

Nokia, Alcatel-Lucent Shanghai Bell, "Eariy Hybrid ARQ Feedback for the 5G New Radio", 3GPP TSG-RAN WG1 #87, Reno, NV, USA, Nov. 14-18, 2016; R1-1612249.

Nokia, Alcatel-Lucent Shanghai Bell, "Early Hybrid ARQ Feedback for the 5G New Radio", 3GPP TSG-RAN WG1 #86 Gothenburg, Sweden, Aug. 22-26, 2016, R1-167302.

Xuemei Bi, "Office Action for CN Application No. 201880045815. 8", dated Nov. 25, 2021, CNIPA, China.

\* cited by examiner

RECEIVER, TRANSMITTER, COMMUNICATION NETWORK, DATA SIGNAL AND METHOD IMPROVING A RETRANSMISSION PROCESS IN A COMMUNICATION NETWORK

CROSS-REFERENCE TO RELATED APPLICATIONS

This application is a continuation of U.S. application Ser. No. 16/680,050, filed Nov. 11, 2019, which is incorporated herein by reference in its entirety, which in turn is a continuation of copending International Application No. PCT/EP2018/061372, filed May 3, 2018, which is incorporated herein by reference in its entirety, and additionally claims priority from European Application No. 17170871.2, filed May 12, 2017, which is also incorporated herein by reference in its entirety.

BACKGROUND OF THE INVENTION

The present invention concerns the field of wireless or wired communication networks or systems, more specifically, communication networks or services provided by communication networks which may request a retransmission of data and/or redundancy. Embodiments of the invention concern an improved retransmission process in a communication network using an early retransmission message, also referred to as an aggressive early predictive hybrid automatic repeat request (AE-HARQ).

FIG. 1 is a schematic representation of an example of a wireless network 100 including a core network 102 and a radio access network 104. The radio access network 104 may include a plurality of base stations eNB$_1$ to eNB$_5$, each serving a specific area surrounding the base station schematically represented by respective cells 106$_1$ to 106$_5$. The base stations are provided to serve users within a cell. A user may be a stationary device or a mobile device. Further, the wireless communication system may be accessed by IoT devices which connect to a base station or to a user. IoT devices may include physical devices, vehicles, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users UE1 and UE2, also referred to as user equipment (UE), that are in cell 106$_2$ and that are served by base station eNB$_2$. Another user UE$_3$ is shown in cell 106$_4$ which is served by base station eNB$_4$. The arrows 108$_1$, 108$_2$ and 108$_3$ schematically represent uplink/downlink connections for transmitting data from a user UE$_1$, UE$_2$ and UE$_3$ to the base stations eNB$_2$, eNB$_4$ or for transmitting data from the base stations eNB$_2$, eNB$_4$ to the users UE$_1$, UE$_2$, UE$_3$. Further, FIG. 1 shows two IoT devices 110$_1$ and 110$_2$ in cell 106$_4$, which may be stationary or mobile devices. The IoT device 110$_1$ accesses the wireless communication system via the base station eNB$_4$ to receive and transmit data as schematically represented by arrow 112$_1$. The IoT device 110$_2$ accesses the wireless communication system via the user UE$_3$ as is schematically represented by arrow 112$_2$. The respective base station eNB$_1$ to eNB$_5$ are connected to the core network 102 via respective backhaul links 114$_1$ to 114$_5$, which are schematically represented in FIG. 1 by the arrows pointing to the "core". The core network 102 may be connected to one or more external networks.

The wireless communication system may be any single-tone or multicarrier system based on frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. In the wireless communication system a transmission time interval (TTI) may be defined, e.g., 1 ms or less. The TTI is the granularity at which the data may be mapped from higher layers to the physical layer (PHY) to perform the transmission.

Data may also be communicated over channels of a wired communication network or a combination of wired and wireless networks, for example, a local area network (LAN), a G.hn network operating over different types of wires like telephone wires, coaxial cables and/or power lines, or a wide area network (WAN) such as the internet.

In the above referenced networks data may be overlaid with noise while being transmitted over the channel so that the data may not be processed correctly or may not be processed at all at the receiver. For example, when the data to be transmitted is encoded using a predefined code, the encoded data is generated at the transmitter and forwarded to the receiver over the channel. During the transmission, the encoded data may be overlaid with noise to such an extent that decoding of the encoded data is not possible, e.g., because of noisy channel situations. To address such a situation, wired and/or wireless communication networks may employ a retransmission mechanism. For example, when the receiver detects that the encoded data cannot be decoded, a retransmission from the transmitter or sender is requested. For example, an HARQ (hybrid automatic repeat request) may be used to request a retransmission from the transmitter to correct decoding failures. For example, additional redundancy may be requested. At the transmitter, encoding the data includes generating redundancy that may include redundant bits that are added to the data to be transmitted. During a first transmission only a part of the redundancy may be transmitted. When a retransmission is requested, further parts of the redundancy may be send to the receiver. For example, HARQ may employ chase combining (every re-transmission contains the same information—data and parity bits), or incremental redundancy (every re-transmission contains different parity bits than the previous one).

The retransmission, however, causes a delay due to the additional round-trip time (RTT) which includes the propagation delays over the network and the processing delays at the receiver, such as the UE, and at the transmitter, such as the eNB. Thus, in communication networks it is desired to reduce delays caused due to erroneous data transmissions and associated retransmission requests. For example, Ultra-Reliable and Low Latency Communication (URLLC) is one of the major use cases of next-generation cellular networks. However, the code rates considered for URLLC may be limited. Thus, depending on the channel situation the system may has to use a higher code rate or a lower code rate. Thus, the system may suffer either from high latency due to frequent HARQ retransmissions or from low spectral efficiency which may also cause high delays if available resources are short. Current solutions as applied, e.g., in the LTE standard use an HARQ feedback indicating whether a decoding attempt was successful (ACK) or was not successful (NACK). However, the feedback may be send only once the full decoding processing has been performed, thus limiting the minimum HARQ timing. That means the receiver has to wait for the received encoded data to pass the whole receiver chain including decoder.

SUMMARY

An embodiment may have a receiver, wherein the receiver is configured to receive data from a transmitter; the data is comprised in a data block which has at least one code block, wherein the code block has a plurality of parts, wherein a first part of the code block is used for estimating a decodability of the code block at the receiver, and wherein the first part of the code block is arranged in the data block ahead of the remaining one or more parts of the code block; the receiver is configured to estimate, prior to receiving the entire data block, the decodability of the code block using the first part of the code block, the data block is defined by a plurality of symbols in a time domain and by a plurality of sub-carriers in a frequency domain, the first parts of the respective code blocks span one or more sub-carriers or one or more initial symbols of the data block or one or more sub-carriers and one or more initial symbols of the data block, and the remaining parts of the respective code blocks are arranged in one or more symbols following the initial symbols in time, and responsive to an estimation indicating that the code block cannot be decoded, the receiver is to request a retransmission from the transmitter and to signal a size of the retransmission.

Another embodiment may have a transmitter, wherein the transmitter is configured to generate a data block having data to be transmitted to a receiver; the transmitter is configured to generate the data block using the data to be transmitted such that the data block has at least one code block, wherein the code block has a plurality of parts, wherein a first part of the code block is used for estimating a decodability of the code block at the receiver, and wherein the first part of the code block is arranged in the data block ahead of the remaining one or more parts of the code block, the data block is defined by a plurality of symbols in a time domain and by a plurality of sub-carriers in a frequency domain, the first parts of the respective code blocks span one or more sub-carriers or one or more initial symbols of the data block or one or more sub-carriers and one or more initial symbols of the data block, and the remaining parts of the respective code blocks are arranged in one or more symbols following the initial symbols in time, and responsive to a request for a retransmission and a signaling of a size of the retransmission from the receiver, the transmitter is to send to the receiver the retransmission.

According to another embodiment, a communication network may have: a receiver, and a transmitter, wherein the transmitter is configured to generate a data block having data to be transmitted to a receiver; the transmitter is configured to generate the data block using the data to be transmitted such that the data block has at least one code block, wherein the code block has a plurality of parts, wherein a first part of the code block is used for estimating a decodability of the code block at the receiver, and wherein the first part of the code block is arranged in the data block ahead of the remaining one or more parts of the code block, the data block is defined by a plurality of symbols in a time domain and by a plurality of sub-carriers in a frequency domain, and the first parts of the respective code blocks span one or more sub-carriers or one or more initial symbols of the data block or one or more sub-carriers and one or more initial symbols of the data block, and the remaining parts of the respective code blocks are arranged in one or more symbols following the initial symbols in time, and responsive to an estimation indicating that the code block cannot be decoded, the receiver is to request a retransmission from the transmitter and to signal a size of the retransmission.

According to still another embodiment, a method may have the steps of: receiving, at a receiver, data from a transmitter, wherein the data is comprised in a data block which has at least one code block, wherein the code block has a plurality of parts, wherein a first part of the code block is used for estimating a decodability of the code block at the receiver, and wherein the first part of the code block is arranged in the data block ahead of the remaining one or more parts of the code block; and estimating at the receiver, prior to receiving the entire data block, the decodability of the code block using the first part of the code block, wherein the data block is defined by a plurality of symbols in a time domain and by a plurality of sub-carriers in a frequency domain, and wherein the first parts of the respective code blocks span one or more sub-carriers or one or more initial symbols of the data block or one or more sub-carriers and one or more initial symbols of the data block, and the remaining parts of the respective code blocks are arranged in one or more symbols following the initial symbols in time, and responsive to an estimation indicating that the code block cannot be decoded, requesting, by the receiver, retransmission from the transmitter and signaling a size of the retransmission.

Another embodiment may have a non-transitory digital storage medium having stored thereon a computer program for performing, when said computer program is run by a computer, a method having the steps of: receiving, at a receiver, data from a transmitter, wherein the data is comprised in a data block which has at least one code block, wherein the code block has a plurality of parts, wherein a first part of the code block is used for estimating a decodability of the code block at the receiver, and wherein the first part of the code block is arranged in the data block ahead of the remaining one or more parts of the code block; and estimating at the receiver, prior to receiving the entire data block, the decodability of the code block using the first part of the code block, wherein the data block is defined by a plurality of symbols in a time domain and by a plurality of sub-carriers in a frequency domain, and wherein the first parts of the respective code blocks span one or more sub-carriers or one or more initial symbols of the data block or one or more sub-carriers and one or more initial symbols of the data block, and the remaining parts of the respective code blocks are arranged in one or more symbols following the initial symbols in time, and responsive to an estimation indicating that the code block cannot be decoded, requesting, by the receiver, retransmission from the transmitter and signaling a size of the retransmission.

BRIEF DESCRIPTION OF THE DRAWINGS

Embodiments of the present invention are now described in further detail with reference to the accompanying drawings, in which.

DETAILED DESCRIPTION OF THE INVENTION

Figure 1:
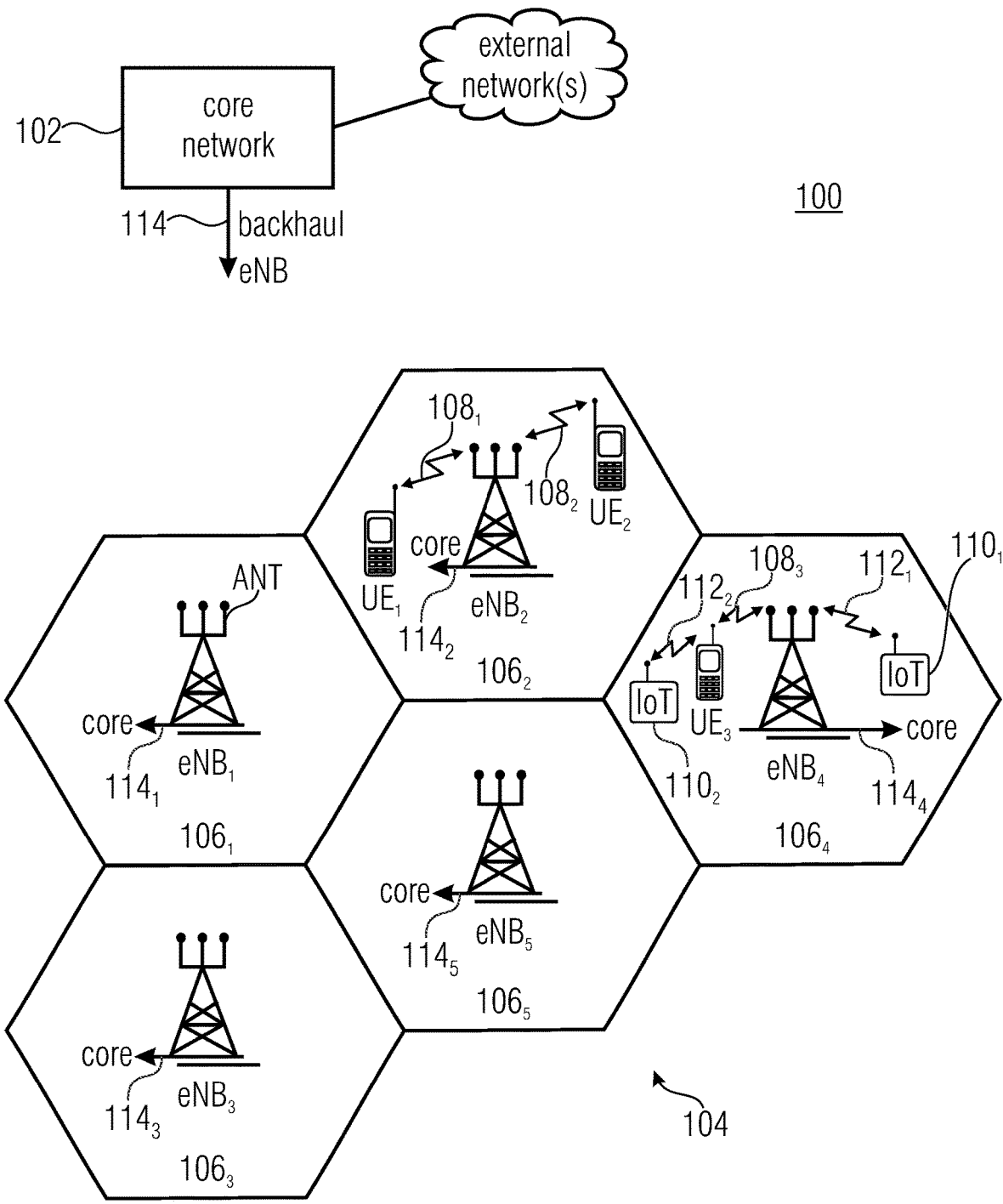
FIG. 1 shows a schematic representation of an example of a wireless communication system.

In the following, embodiments of the present invention are described in further detail with reference to the enclosed drawings in which elements having the same or similar function are referenced by the same reference signs.

In accordance with the inventive approach an improved retransmission process in a communication network is provided which allows for an early retransmission request to be sent, also referred to in the following as an aggressive early HARQ (AE-HARQ) feedback. The inventive AE-HARQ feedback allows reducing the retransmission delay or HARQ delay experienced when implementing conventional HARQ procedures. The inventive approach is advantageous as it allows reducing the feedback timing to a minimum time, and allows providing redundancy, such as further redundancy versions (RVs) of the data, at an earlier stage. The inventive approach proposes a new format for a data block to be transmitted to a receiver so as to enable AE-HARQ for one or multiple code block (CBs) provided in the data block. For example, the MAC layer passes a data to the PHY layer which segments the data into smaller pieces for the encoder which generates the respective code blocks, which are arranged in the TB in the PHY layer in accordance with the inventive approach. A TB may include one or more code blocks (CBs), and a conventional or regular HARQ feedback may be provided after the TB has been fully processed at the receiver. In case the TB includes a plurality of CBs, respective ones of the CBs may be grouped so as to form a plurality of code block groups (CBGs). In other words, each CBG may include at least one CB or at maximum all CBs provided in the TB. Other than the TB, each CBG may be processed independently at the receiver with a separate feedback for each CBG.

In accordance with the inventive approach, to allow for an early feedback the code block in the data block comprises a plurality of parts, and a first part of the code block is used for estimating a decodability of the code block at the receiver. In accordance with embodiments, the first part may be obtained by using an approach as described in EP 16200316.0 filed on Nov. 23, 2016 and incorporated herewith by reference. In accordance with other embodiments, the first part may be any other subset of the CB if a LLR (log-likelihood ratio) estimation is used. The first part of the code block is arranged in the data block ahead of the remaining one or more parts of the code block. By placing the first part of the code block ahead of the remaining parts, the first part is transmitted prior to the remaining parts of the CB, and an estimation of the decodability of the code block may already start at the receiver while the data block is still received at the receiver. Responsive to the estimation the AE-HARQ feedback may be sent as early as possible, for example separately for each CB. In case multiple CBs are transmitted in the data block for at least some of the CBs an AE-HARQ feedback may be provided, and the respective feedback messages may be collected and transmitted in a bundled manner before the data block, also referred to as codeword, has been fully processed at the receiver.

Thus, the inventive approach allows for a decodability estimation prior to receipt of the complete data block at the receiver. The data block includes at least one code block with the first part of the CB placed ahead of the remaining parts of the CB. At a time at which the data block is still received, the receiver may already determine from the first part of the code block whether the code block may be decoded or not. In case decodability is determined to be not possible, i.e., the code block cannot be decoded by the receiver, or in case it is determined that it is unlikely that the code block can be decoded, an early retransmission may be triggered to request the code block to be retransmitted or to request additional redundancy for the code block not yet transmitted. This reduces the delay as, other than in conventional approaches, the retransmission may be requested before the current transmission, e.g. the current TTI, is completed, and the transmitter may send the requested additional redundancy during the very next transmission, e.g. during the next TTI. This enhancement of the retransmission process and the associated reduction of delays shall now be discussed in further detail below with reference to specific, non-limiting embodiments.

In accordance with the present invention, the data to be transmitted over a channel of a communication network is encoded using a predefined code, which may be selected from a plurality of available codes. The data form a higher layer is split or segmented and the segments are provided to the encoder so as to generate respective code blocks having a first part and further parts. The first part of such a code block is located in the data block ahead of the remaining parts. When transmitting the data block to the receiver, a first part of a code block is received and processed first. On the basis of the first part of the CB, the decoder may estimate the decodability of the entire code block and issue an appropriate early retransmission message back to the transmitter.

In accordance with the inventive approach, the modified data block structure is exploited to estimate the decodability of an entire code block in the data block before actually the code block has been received and processed, which is also referred to as an early aggressive predictive HARQ feedback. The advantage is that the latency may be decreased as an HARQ retransmission may be performed earlier. The savings may be due to the early feedback which is returned to the sender or transmitter before the whole or entire codeword is received. Further, savings may be obtained due to the reduced estimation complexity as only a part of the codeword needs to be estimated.

In accordance with the present invention, dependent on the result of the estimate, the receiver may request additional redundancy or may signal to the transmitter that no more redundancy is needed, because it is estimated that the code block is decodable or is likely to be decodable. In this case, the transmitter may stop sending redundancy to avoid unnecessary retransmissions and reduce latencies during the data transmission. Instead, the transmitter may already start sending the data block, in case further data is to be transmitted. In accordance with further embodiments, the receiver may not send a signal to the transmitter in case it is estimated that the code block is decodable or is likely to be decodable. The transmitter may transmit, during the next transmission the redundancy, if explicitly requested by the receiver, otherwise, the transmitter transmits new data, if available. In case no new data is available for the receiver during the next transmission and in case no redundancy is requested, the transmitter will not send information for the receiver during the next transmission.

In accordance with further embodiments, the receiver may perform an evaluation of the estimation, so as to obtain a level of confidence of the estimation result. In addition to the actual estimation result, the additional level of confidence may be taken into consideration when deciding whether additional redundancy is to be requested from the transmitter. Based on the confidence, the receiver may perform, for example, a two or more bit feedback. According to the confidence level, the transmitter may decide how much redundancy is needed for the retransmission.

Figure 2:
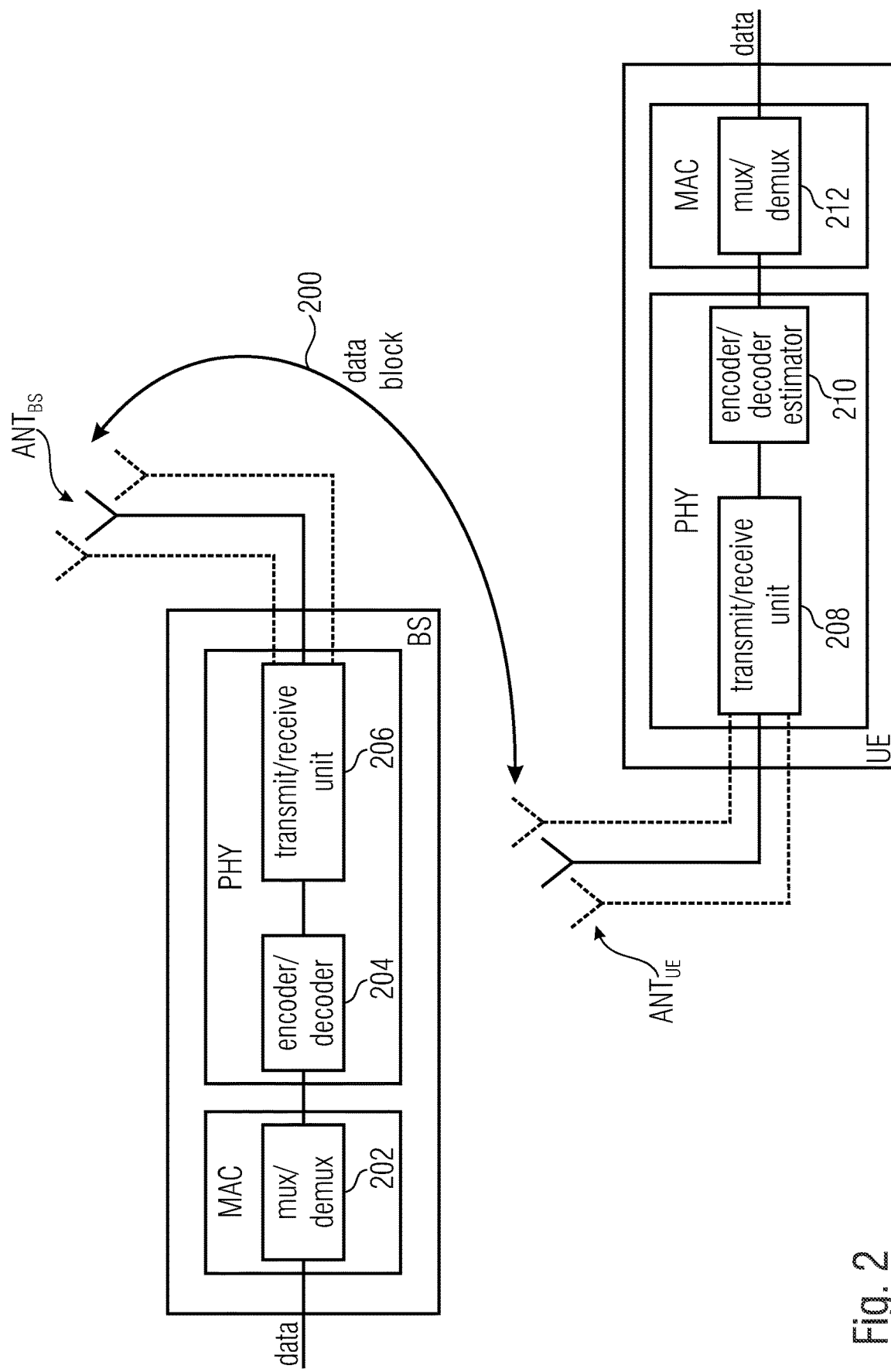
FIG. 2 is a schematic representation of a wireless communication system for transmitting information from a transmitter to a receiver.

Embodiments of the present invention may be implemented in a wireless communication system as depicted in FIG. 1 including base stations and UEs, like mobile terminals or IOT devices. FIG. 2 is a schematic representation of a wireless communication system for communicating information between a base station BS and a UE. The base station BS includes one or more antennas $ANT_{BS}$ or an antenna array having a plurality of antenna elements. As is indicated by the arrow 200 signals are communicated between the base station BS and the UE via a wireless communication link, like a radio link. The wireless communication system may operate in accordance with the embodiments described herein.

In accordance with embodiments, for example in case of a downlink data transmission in the wireless communication network, the base station BS receives data to be transmitted to the UE. The BS includes a multiplexer/demultiplexer unit 202 which may be provided, e.g., by the MAC layer, as well as an encoder/decoder 204 and a transmit/receive unit 206 connected to the one or more antennas $ANT_{BS}$, which may be provided, e.g., by the PHY layer. The UE includes a transmit/receive unit 208 connected to the one or more antennas $ANT_{UE}$ and an encoder/decoder 210 having an estimator, which may be provided, e.g., by the PHY layer, as well as a multiplexer/demulitplexer unit 212 which may be provided, e.g., by the MAC layer. The data is provided from the multiplexer/demulitplexer unit 202 to the encoder/decoder 204 which outputs a data block, such as a TB, to be transmitted during a predefined transmission time, like a TTI, from the base station BS to the receiver UE using the transmit/receive unit 206. The data block is transmitted via the radio link 200 to the UE receiving the data block via the transmit/receive unit 208 and forwarding the received data block to the encoder/decoder 210. After decoding, the decoded signal is demultiplexed by the a multiplexer/demulitplexer unit 212, and the data is output.

In accordance with the inventive approach, the CB or at least some of the CBs are split by the encoder into first and further parts to allow of a decodability estimation for the respective CB(s) at the receiver using the first part(s). In accordance with embodiments, the receiver may estimate the decodability of the entire code clock using the first part of a code block, for example by employing a maximum-likelihood (ML) decoder. In accordance with other embodiments, for example to reduce implementation complexity, other decoders may be used, like believe-propagation based decoders, for example an adjusted min-sum decoder or a sum-product decoder.

FIG. 2 describes an embodiment in which the BS is the transmitter and the UE is the receiver, as is, for example, the case in a downlink data transmission in the wireless communication network. However, in accordance with other embodiments, for example in case of an uplink data transmission in the wireless communication network, the UE is the transmitter and the base station BS is the receiver and also in such an uplink data transmission the inventive approach discussed herein may be applied so as to allow for an early feedback from the base station to the UE.

Figure 3:
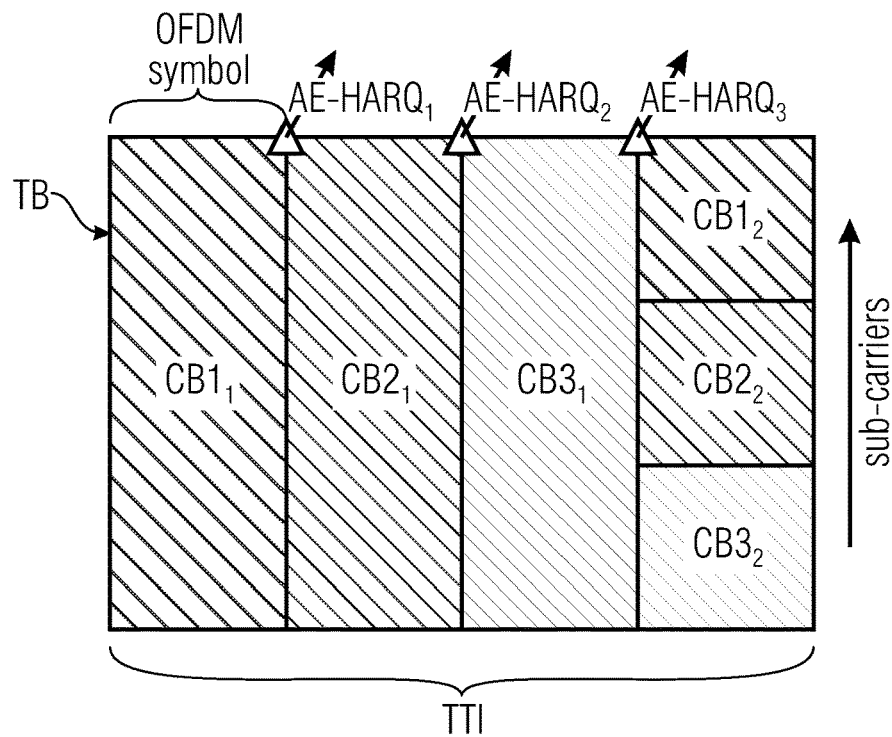
FIG. 3 is a schematic representation of a data block, such as a TB, in accordance with an embodiment for implementing the inventive AE-HARQ feedback.

FIG. 3 is a schematic representation of a data block, such as a TB, in accordance with an embodiment for implementing the inventive AE-HARQ feedback by providing CBs with first or early parts and further parts. The TB spans a predefined period in time, for example a time as defined by the TTI. The TB includes three code blocks CB1 to CB3 which, in accordance with the inventive approach, are reordered or distributed within the TB, such that respective first parts $CB1_1$ to $CB3_1$ of the respective code blocks CB1 to CB3 are located at initial OFDM symbols, and second parts $CB1_2$ to $CB3_2$ of the respective code blocks CB1 to CB3 are located at one or more OFDM symbols following the initial symbols. In this embodiment it is assumed that during the TTI four symbols, like OFDM symbols, are transmitted on the plurality of subcarriers, and the TB includes the three CBs CB1 to CB3 having the respective parts distributed $CB1_1$ to $CB3_1$ and $CB1_2$ to $CB3_2$ over four OFDM symbols per TTI. The first parts $CB1_1$ to $CB3_1$ are used for the estimation and are transmitted in the first OFDM symbols, while the remaining parts $CB1_2$ to $CB3_2$ are distributed in the last OFDM symbol so that the UE may start computing a feedback as it gets the first part $CB1_1$ to $CB3_1$ of the respective CBs. Transmitting the TB of FIG. 3 over the radio link 200 causes the first parts $CB1_1$ to $CB3_1$ of the respective CBs CB1 to CB3 to be transmitted and received prior to the remaining parts $CB1_2$ to $CB3_2$. The respective first parts $CB1_1$ to $CB3_1$ are selected such that upon receiving the data block, the encoder/decoder 210 of the UE, which may also include the estimator, is in a position to perform, on the basis of the first parts $CB1_1$ to $CB3_1$, respective estimations as to the decodability of the complete code blocks CB1 to CB3 prior to completely receiving and decoding the respective code block.

In the example of FIG. 3, upon transmitting the data defined by the TB over the radio link 200, in accordance with the inventive approach, an early retransmission message $AE-HARQ_1$ may be determined on the basis of the received and decoded first part $CB1_1$ of the code block $CB_1$. The early retransmission message $AE-HARQ_1$ may indicate that the decoder will be able to successfully decode the $CB_1$ and send an acknowledgement message ACK (a first early retransmission message) to the transmitter or it may be determined that, in view of the estimation, the decoder may not successfully decode the code block $CB_1$. In this case, a corresponding non-acknowledgement NACK message (a second early retransmission message) is sent back to the transmitter.

It is noted that the inventive approach is not limited to the specific TB structure shown in FIG. 3. Rather, more than the three CBs may be provided within a transport block, dependent on, for example, the length of the TTI. Also less than three CBs may be included. Further, not all of the CBs may be suitable or used for an early feedback so that only one or some of the code blocks may be used in accordance with the inventive approach and are split into respective early or first parts used for estimation and later parts. Embodiments in which only a subset of code blocks are used for the estimation may be implemented in a situation when some code blocks are sent within the TB at a time that is too late so as to allow the decoder at the UE for decoding a first part prior to the full processing of the CB at the UE. Further, in case data related to different services are transmitted in the same TB, there may be services, such as non-ULLRC services, that do not require an early feedback. For such services no splitting of the CB(s) and early transmission of the first parts of the CB(s) is needed.

Figure 4:
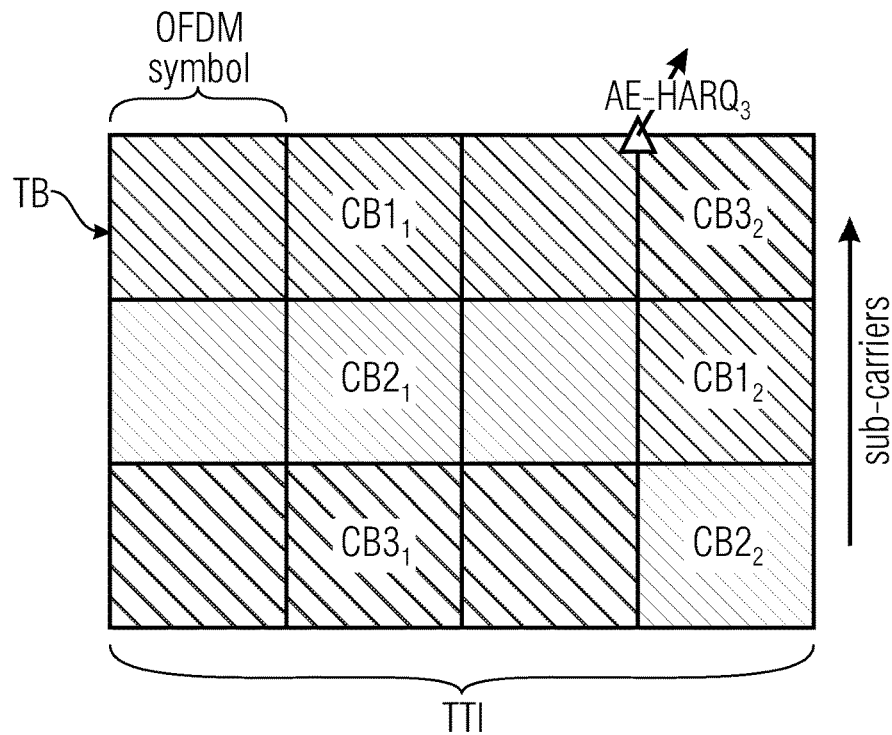
FIG. 4 is a schematic representation of a data block, such as a TB, in accordance with another embodiment for implementing the inventive AE-HARQ feedback.

FIG. 4 shows another embodiment of the inventive data block structure in which the first or early parts $CB1_1$ to $CB3_1$ of the respective code blocks CB1 to CB3 are distributed in different way in the TB, namely over different frequency ranges, for example at the same OFDM symbol. However, in accordance with other embodiments they may also be distributed at different OFDM symbols, and the remaining parts are allocated at different frequency ranges in the following OFDM symbols. The first parts $CB1_1$ to $CB3_1$ of the respective code blocks CB1 to CB3 are transmitted ahead of the remaining parts $CB1_2$ to $CB3_2$ to allow for the early feedback on the basis of an estimation of the decodability of the entire code blocks based on the early parts $CB1_1$ to $CB3_1$ thereof. In the embodiment of FIG. 3, the UE may send the AE-HARQ feedback separately for each of the CBs as early as possible, i.e., after receiving and decoding the first part of the corresponding CB. On the other hand, in accordance with the embodiment of FIG. 4, the UE may wait to receive some or all of the first parts of the CBs and to then send the feedback. The UE still does not wait for the entire TTI but only until the first parts of the respective CBs have been received, for example until the first part of the last CB of a predefined group, like a CBG, has been received. Then the AE-HARQ feedback may be transmitted in a bundled manner as is schematically depicted in FIG. 4.

Furthermore, in the TB of FIG. 4 there may be OFDM symbols in which no data signal is transmitted, for example some of the OFDM symbols may be used for transmitting pilot signals. Also in the TB of FIG. 3 there may be OFDM symbols in which no data signal is transmitted.

In accordance with further embodiments, the inventive approach of providing early retransmission requests or messages and conventional retransmission requests may be combined. The AE-HARQ approach may have a certain misprediction probability which may be critical in the false positive case meaning that the receiver sends the AE-ACK message but cannot decode the code block. To increase the reliability, in accordance with embodiments the inventive early retransmission request approach and a conventional retransmission approach, such as HARQ, may be combined. On the basis of the above described data block structure, a joint operation mode for AE-HARQ and normal HARQ is implemented. In accordance with such embodiments, the receiver, like the UE in FIG. 2, may provide the AE-HARQ feedback as described above, and after processing/decoding the full data block, in addition, an absolute HARQ feedback determined on the basis of the fully decoded signal may be transmitted.

Figure 5:
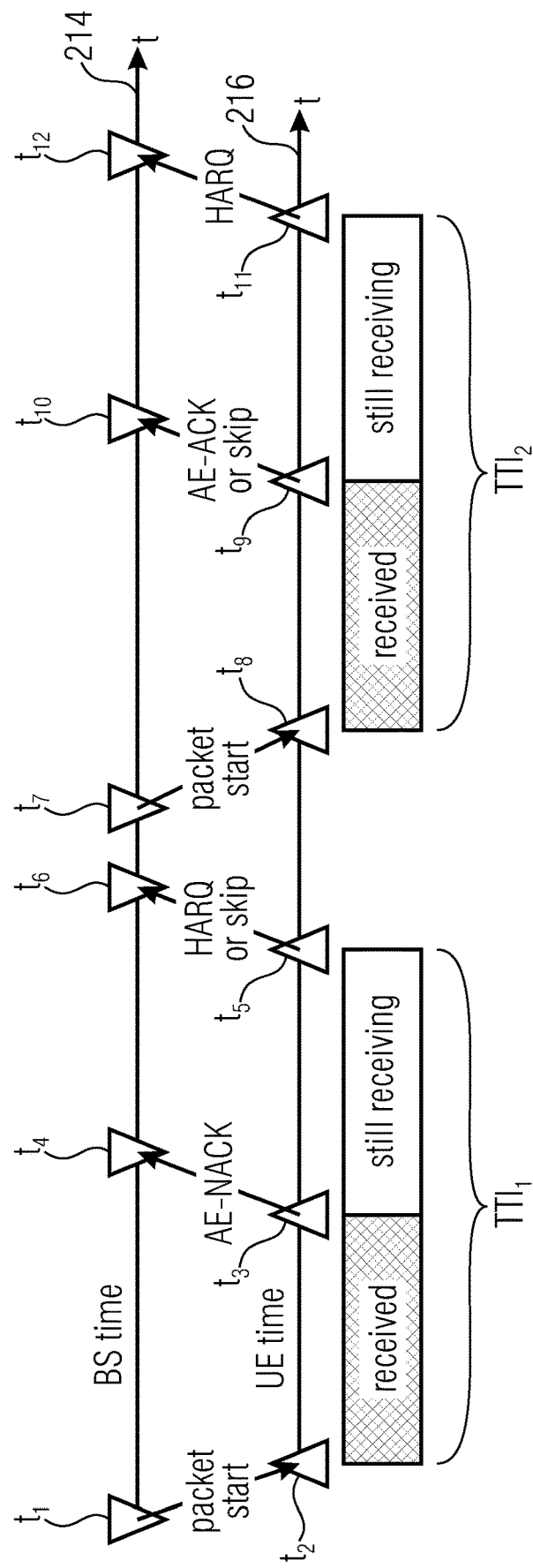
FIG. 5 schematically shows an embodiment of a joint operation of the inventive AE-HARQ procedure and a conventional HARQ procedure.

FIG. 5 schematically shows an embodiment of a joint operation of the inventive AE-HARQ procedure and the conventional HARQ procedure. In FIG. 5, the upper horizontal arrow 214 indicates the BS time, and the lower horizontal arrow 216 indicates the UE timeline. At a time $t_1$ the base station starts to transmit the data block, referred to in the following as data packet, over the wireless or wired channel. The data packet is received at the UE at the time $t_2$. The time for receiving and processing the complete data packet is the first transmission interval $TTI_1$, which has a predefined duration or length. At a time $t_3$, which is prior to the end of the first transmission interval $TTI_1$, the first part of a code block, for example the first part $CB1_1$ of the code block CB1 in FIG. 3, has been received, and the UE decoder is estimates the decodability of the entire code block CB1 on the basis of the first part $CB1_1$. Responsive to the estimation at time $t_3$, the early retransmission message is transmitted and received at the transmitter which at the time $t_4$. The time $t_4$ is a time between the beginning of the first transmission interval $TTI_1$ at the time $t_3$ and the end of the first transmission interval $TTI_1$ at the time $t_5$. When the inventive early retransmission procedure messages is combined with the conventional HARQ procedure, for example to avoid a false positive misprediction, at the end of the first transmission interval $TTI_1$ at the time $t_5$ a regular retransmission message or HARQ message may be transmitted and received at the BS at the times $t_6$. On the basis of the HARQ message at the time $t_6$ the early retransmission message received at time $t_4$ may be confirmed.

Following the end of the first transmission interval $TTI_1$ at the time $t_5$, and following the time $t_6$, the base station BS may transmit the next data packet at the time $t_7$. The next data packet is received at the UE at the time $t_8$. The time for fully or completely receiving and processing the next data packet is the second transmission interval $TTI_2$, which may have the same or a different length than the first transmission interval $TTI_2$. At a time $t_9$, which is prior to the end of the second transmission interval $TTI_2$, the first part of a code block, for example the first part $CB1_1$ of the code block CB1 in FIG. 3, has been received, and the UE decoder is estimates the decodability of the entire code block CB1 on the basis of the first part $CB1_1$. Responsive to the estimation at time $t_9$, the early retransmission message is transmitted and received at the transmitter which at the time $t_{10}$. The time $t_{10}$ is a time between the beginning of the second transmission interval $TTI_2$ at the time $t_8$ and the end of the second transmission interval $TTI_2$ at the time $t_{11}$. When the inventive early retransmission procedure messages is combined with the conventional HARQ procedure, for example to avoid a false positive misprediction, at the end of the second transmission interval $TTI_2$ at the time t11 a regular retransmission message or HARQ message may be transmitted and received at the BS at the times $t_{12}$. On the basis of the HARQ message at the time $t_{12}$ the early retransmission message received at time $t_4$ may be confirmed.

Dependent on the contents of the early retransmission message transmitted, e.g., at times $t_3$ and $t_9$ in FIG. 5, the base station may prepare for the transmission of redundancy information in the next data packet or may see that, at least for the code block currently processed, no redundancy is needed so that in the next data packet new data may be transmitted. In the example depicted in FIG. 5, the early retransmission message transmitted at time $t_3$ is an AE-NACK message, indicating that the evaluated code block is not decodable. Responsive to the receipt of the AE-NACK message at the time $t_4$ the base station may already provide the redundancy information for the code block which may be transmitted during in the immediately following the second transmission interval $TTI_2$ in the data packet send out at the time $t_7$. Thus, the inventive approach allows providing the retransmission faster than when implementing only the conventional HARQ procedure which has to wait until the time $t_6$ for the regular HARQ message so that sending the redundancy in the immediately following second transmission interval is no possible, but the redundancy may only be sent in the next but one transmission interval, like a third transmission interval $TTI_3$ (not shown in FIG. 5). Further, in the example depicted in FIG. 5, the early retransmission message transmitted at time $t_9$ is an AE-ACK message, indicating that the evaluated code block is decodable. Responsive to the receipt of the AE-ACK message at the time $t_{10}$ the base station does not provide any redundancy information for the code block. Rather, new data to be transmitted in a third transmission interval $TTI_3$ (not shown in FIG. 5) following the second transmission interval $TTI_2$ may be prepared to be included into the next data packet.

In accordance with further embodiments, the above described scheme of combining the inventive AE-HARQ procedure and the conventional HARQ procedure may be modified to save feedback overhead in certain situations as will be described in more detail below.

In accordance with a first embodiment an AE-HARQ skipping may be implemented. For example, in case the receiver predicts that the code block is decodable, i.e., the receiver predicts an AE-ACK (see time $t_9$ in FIG. 5), signaling overhead may be avoided by not transmitting the AE-ACK message (the first early retransmission message) as no further action responsive to such an AE-HARQ feedback is used at the transmitter. In such an embodiment, the transmitter BS, e.g., starting at the time $t_7$, may monitor a feedback channel for messages from the receiver. In case no early retransmission request is received until a predefined time after the time $t_7$, at which the sending of the data packet started, the base station proceeds on the assumption that no retransmission is required so that, instead of providing redundancy in the next data packet, new data may be provided. The predefined time may be a period less than the length of the $TTI_2$, for example the time $t_{10}$.

In accordance with another embodiment the AE-HARQ skipping may be implemented such that instead of skipping the AE-ACK message indicating a decodability of the code block, the AE-NACK message (the second early retransmission message) indicating a non-decodability may be skipped. Considering, for example, the time $t_3$ in FIG. 5, the AE-NACK message is not transmitted, and the base station, for example at a sufficient time following time $t_1$, at which the data packet transmission started, and prior to the end of $TTI_1$, recognizes that neither an AE-ACK message nor an AE-NACK message was received. IN this case, the BS, knowing about the implementation of the AE-HARQ skipping implementation, assumes that the decodability of the code block is not given and provides redundancy for the currently decoded code block for retransmission in the next TTI, namely $TTI_2$. The just described embodiments avoid scenarios in which the transmitter BS misses the AE-HARQ feedback and, therefore, would not provide any redundancy. Although the spectral efficiency may be slightly degraded in case the transmitter misses the AE-ACK and, therefore, performs a retransmission which is actually not needed, the reliability and latency is still improved.

In accordance with yet further embodiments, when considering the joint operation of AE-HARQ and normal HARQ procedures, the HARQ may be skipped, i.e., at the end of the TTI no retransmission message will be sent. For example, in case the receiver did not send an AE-NACK or did not send an AE-ACK (in case the above described AE-HARQ skipping is implemented), which corresponds to sending an AE-NACK, the HARQ feedback, namely the regular retransmission feedback, is redundant as redundancy has already been triggered early in accordance with the inventive AE-HARQ scheme. In such a scenario, the normal HARQ feedback sent, for example, at times $t_5$ and $t_{11}$ in FIG. 5, considering the fully or completely processed code block is no longer needed, and the receiver may skip the HARQ feedback.

In accordance with further embodiments, instead of skipping the HARQ feedback, as described above, it may also be shifted. For example, in case the receiver sent an AE-NACK or the AE-ACK was not sent due to AE-HARQ skipping, the HARQ feedback is redundant, as mentioned above. However, rather than skipping the HARQ feedback as described in the above embodiments, the HARQ feedback may be shifted or postponed until after the reception of the AE-HARQ triggered redundancy and the regular HARQ operation is then allowed once the code block with the additional redundancy has been fully received.

In accordance with yet further embodiments, the receiver may be configured to expect an implicit HARQ retransmission. For example, after triggering an NACK or AE-NACK, the receiver expects the HARQ retransmission in a preconfigured TTI. The TTI may be dynamically or semi-statically configured or may be defined by the specification of the communication standard used in the wireless communication network. Also the size of the expected retransmission, like the size of the expected redundancy version, is signaled to or is known at the receiver and is also known at the transmitter. In this case, the transmitter may combine additional new data with the redundancy in the same data block or transport block. The transmitter may include the redundancy at the preconfigured location within the transport block and may fill up the remaining locations of the transport block with new data. In case the location and size of the redundancy is known at the receiver, no explicit signaling is required, otherwise also a brief signaling may be made to inform the receiver about the location and size of the redundancy information.

In accordance with further embodiments, the just described implicit HARQ transmission may also contain an indicator or an HARQ process number signaling to the receiver that redundancy information can be found for the receiver. In accordance with other embodiments, an HARQ feedback approval may also be included. To avoid misinterpretation of the HARQ feedback the transmitter may provide the received HARQ feedback by signaling the received value back to the receiver.

In accordance with embodiments, the inventive approach described above may be implemented in mobile communication networks operating in accordance with existing standards to use the inventive aggressive early HARQ feedback, e.g., in LTE, 3GG. In accordance with other embodiments, the inventive approach described above may be implemented in next-generation cellular networks or mobile communication networks operating, e.g., in accordance with 5G/NR (new radio).

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 6:
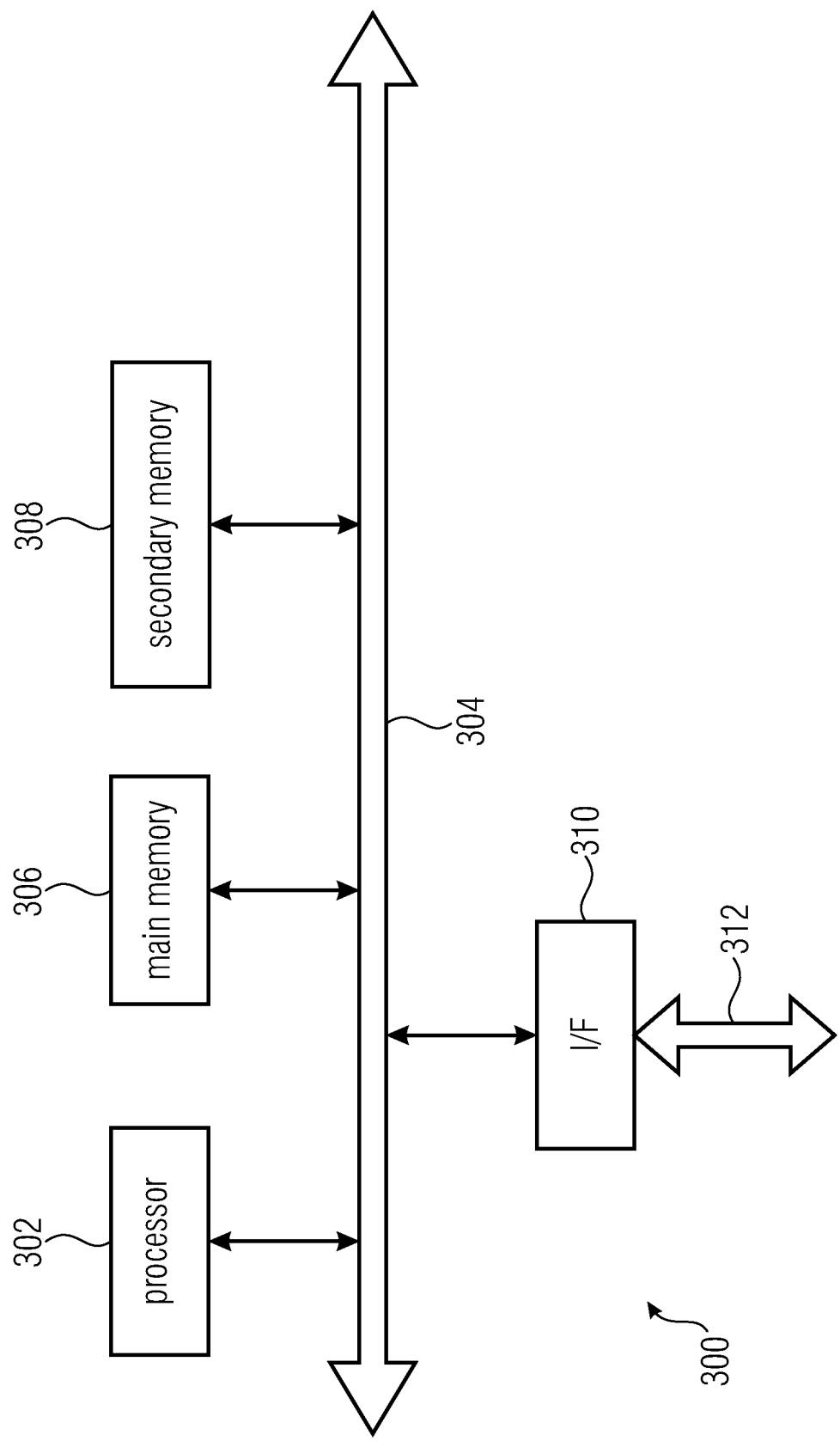
FIG. 6 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 6 illustrates an example of a computer system 300. The units or modules as well as the steps of the methods performed by these units may execute on one or more computer systems 300. The computer system 300 includes one or more processors 302, like a special purpose or a general purpose digital signal processor. The processor 302 is connected to a communication infrastructure 304, like a bus or a network. The computer system 300 includes a main memory 306, e.g., a random access memory (RAM), and a secondary memory 308, e.g., a hard disk drive and/or a removable storage drive. The secondary memory 308 may allow computer programs or other instructions to be loaded into the computer system 300. The computer system 300 may further include a communications interface 310 to allow software and data to be transferred between computer system 300 and external devices. The communication may be in the form electronic, electromagnetic, optical, or other signals capable of being handled by a communications interface. The communication may use a wire or a cable, fiber optics, a phone line, a cellular phone link, an RF link and other communications channels 312.

The terms "computer program medium" and "computer readable medium" are used to generally refer to tangible storage media such as removable storage units or a hard disk installed in a hard disk drive. These computer program products are means for providing software to the computer system 300. The computer programs, also referred to as computer control logic, are stored in main memory 306 and/or secondary memory 308. Computer programs may also be received via the communications interface 310. The computer program, when executed, enable the computer system 300 to implement the present invention. In particular, the computer program, when executed, enable processor 302 to implement the processes of the present invention, such as any of the methods described herein. Accordingly, such a computer program may represent a controller of the computer system 300. Where the disclosure is implemented using software, the software may be stored in a computer program product and loaded into computer system 300 using a removable storage drive, an interface, like communications interface 310.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A receiver, wherein
the receiver is configured to receive data from a transmitter;
the data is comprised in a data block which comprises at least one code block, wherein the code block comprises a plurality of parts, wherein a first part of the code block is used for estimating a decodability of the code block at the receiver, and wherein the first part of the code block is arranged in the data block ahead of the remaining one or more parts of the code block;
the receiver is configured to estimate, prior to receiving the entire data block, the decodability of the code block using the first part of the code block,
the data block is defined by a plurality of symbols in a time domain and by a plurality of sub-carriers in a frequency domain,
the first parts of the respective code blocks span one or more sub-carriers or one or more initial symbols of the data block or one or more sub-carriers and one or more initial symbols of the data block, and the remaining parts of the respective code blocks are arranged in one or more symbols following the initial symbols in time, and
responsive to an estimation indicating that the code block cannot be decoded, the receiver is to request a retransmission from the transmitter and to signal a size of the retransmission.

2. The receiver of claim 1, wherein
the data block comprises a plurality of code blocks, wherein a subset of the plurality of code blocks comprises a plurality of parts, wherein a first part of the subset of the plurality of code blocks is used for estimating the decodability of the respective code block at the receiver, and wherein the first part of the respective code block is arranged in the data block ahead of the remaining one or more parts of the respective code block; and the receiver is configured to estimate, prior to receiving the entire data block, the decodability of the subset of the plurality of code blocks using the first part of the respective code block.

3. The receiver of claim 2, wherein the subset of the plurality of code blocks comprises all code blocks in the data block.

4. The receiver of claim 1, wherein, responsive to the estimation, the receiver is configured to transmit to the transmitter an early retransmission message prior to receiving the entire data block.

5. The receiver of claim 4, wherein the receiver is configured to generate the early retransmission message for each of a plurality of code blocks, and to transmit to the transmitter, prior to receiving the entire data block, a separate early retransmission message for each of the code blocks or a bundled early retransmission message based on the respective early retransmission messages.

6. The receiver claim 1, comprising
a decoder configured to receive the code blocks for decoding thereof once the entire data block is received,
wherein the receiver is configured to transmit to the transmitter further retransmission messages, the further retransmission messages comprising a first further retransmission message indicating to the transmitter, in case the decoder indicates that the code blocks are decodable, a successful receipt of the code blocks, and a second further retransmission message indicating to the transmitter, in case the decoder indicates that the code blocks are not decodable, a non-successful receipt of the code blocks.

7. The receiver of claim 1, comprising
a decoder configured to receive the code blocks for decoding thereof once the entire data block is received,
wherein the receiver is configured to transmit to the transmitter further retransmission messages, the further retransmission messages comprising a first further retransmission message indicating to the transmitter, in case the decoder indicates that the code blocks are decodable, a successful receipt of the code blocks, and a second further retransmission message indicating to the transmitter, in case the decoder indicates that the code blocks are not decodable, a non-successful receipt of the code blocks,
wherein the receiver is configured to skip or postpone the transmission of the further retransmission message to the transmitter,
in case the receiver is configured to operate in the first mode and the second early retransmission message is transmitted, or
in case the receiver is configured to operate in the second mode and the second early retransmission message is skipped, or
in case the receiver is configured to operate in the third mode and the second early retransmission message is transmitted.

8. The receiver of claim 7, wherein the receiver is configured to postpone the transmission of the further retransmission message to the transmitter until receiving redundancy in reply to the second early retransmission message and decoding the code blocks and the received redundancy.

9. The receiver of claim 7, wherein, responsive to transmitting the second early retransmission message or the second further retransmission message, the receiver is configured to expect a retransmission in a retransmission data block following the data block.

10. The receiver of claim 9, wherein the retransmission data block is dynamically or semi-statically configured or is predefined.

11. The receiver of claim 9, wherein the retransmission data block comprises redundancy for the code blocks and new data, wherein a location of the redundancy in the retransmission data block is signaled to or is known at the receiver.

12. The receiver of claim 9, wherein the retransmission data block comprises an indicator signaling the receiver that redundancy is comprises or an indicator signaling the receiver an Hybrid Automatic Repeat reQuest, HARQ, process number.

13. The receiver of claim 9, wherein the receiver is configured to receive from the transmitter a feedback signal confirming a retransmission requested by the receiver.

14. The receiver of claim 7, wherein the second early retransmission message or the second further retransmission message request redundancy from the transmitter, and wherein the redundancy comprises chase combining, or incremental redundancy, or redundancy comprising new data acquired through coupling.

15. The receiver of claim 1, comprising a Maximum-Likelihood decoder or belief-propagation based decoder to estimate the decodability of the code block.

16. The receiver of claim 1, wherein the data block comprises a transport block or a Code Block Group.

17. A transmitter, wherein
the transmitter is configured to generate a data block comprising data to be transmitted to a receiver;
the transmitter is configured to generate the data block using the data to be transmitted such that the data block comprises at least one code block, wherein the code block comprises a plurality of parts, wherein a first part of the code block is used for estimating a decodability of the code block at the receiver, and wherein the first part of the code block is arranged in the data block ahead of the remaining one or more parts of the code block,
the data block is defined by a plurality of symbols in a time domain and by a plurality of sub-carriers in a frequency domain,
the first parts of the respective code blocks span one or more sub-carriers or one or more initial symbols of the data block or one or more sub-carriers and one or more initial symbols of the data block, and the remaining parts of the respective code blocks are arranged in one or more symbols following the initial symbols in time, and
responsive to a request for a retransmission and a signaling of a size of the retransmission from the receiver, the transmitter is to send to the receiver the retransmission.

18. A communication network, comprising:
a receiver, and
a transmitter, wherein
the transmitter is configured to generate a data block comprising data to be transmitted to a receiver;
the transmitter is configured to generate the data block using the data to be transmitted such that the data block comprises at least one code block, wherein the code block comprises a plurality of parts, wherein a first part of the code block is used for estimating a decodability of the code block at the receiver, and wherein the first part of the code block is arranged in the data block ahead of the remaining one or more parts of the code block, the data block is defined by a plurality of symbols in a time domain and by a plurality of sub-carriers in a frequency domain, and the first parts of the respective code blocks span one or more sub-carriers or one or more initial symbols of the data block or one or more sub-carriers and one or more initial symbols of the data block, and the remaining parts of the respective code blocks are arranged in one or more symbols following the initial symbols in time, and responsive to an estimation indicating that the code block cannot be decoded, the receiver is to request a retransmission from the transmitter and to signal a size of the retransmission.

19. A method, comprising receiving, at a receiver, data from a transmitter, wherein the data is comprised in a data block which comprises at least one code block, wherein the code block comprises a plurality of parts, wherein a first part of the code block is used for estimating a decodability of the code block at the receiver, and wherein the first part of the code block is arranged in the data block ahead of the remaining one or more parts of the code block; and estimating at the receiver, prior to receiving the entire data block, the decodability of the code block using the first part of the code block, wherein the data block is defined by a plurality of symbols in a time domain and by a plurality of sub-carriers in a frequency domain, and wherein the first parts of the respective code blocks span one or more sub-carriers or one or more initial symbols of the data block or one or more sub-carriers and one or more initial symbols of the data block, and the remaining parts of the respective code blocks are arranged in one or more symbols following the initial symbols in time, and responsive to an estimation indicating that the code block cannot be decoded, requesting, by the receiver, retransmission from the transmitter and signaling a size of the retransmission.

20. A non-transitory digital storage medium having stored thereon a computer program for performing, when said computer program is run by a computer, a method, comprising:

receiving, at a receiver, data from a transmitter, wherein the data is comprised in a data block which comprises at least one code block, wherein the code block comprises a plurality of parts, wherein a first part of the code block is used for estimating a decodability of the code block at the receiver, and wherein the first part of the code block is arranged in the data block ahead of the remaining one or more parts of the code block; and estimating at the receiver, prior to receiving the entire data block, the decodability of the code block using the first part of the code block, wherein the data block is defined by a plurality of symbols in a time domain and by a plurality of sub-carriers in a frequency domain, and wherein the first parts of the respective code blocks span one or more sub-carriers or one or more initial symbols of the data block or one or more sub-carriers and one or more initial symbols of the data block, and the remaining parts of the respective code blocks are arranged in one or more symbols following the initial symbols in time, and responsive to an estimation indicating that the code block cannot be decoded, requesting, by the receiver, retransmission from the transmitter and signaling a size of the retransmission.

* * * * *